(12) United States Patent
Elbaz et al.

(10) Patent No.: US 8,272,572 B2
(45) Date of Patent: Sep. 25, 2012

(54) SECURE INSERT INTENDED, NOTABLY, FOR A CHIP CARD

(75) Inventors: Didier Elbaz, Marseilles (FR); Thomas Battmann, Luynes (FR)

(73) Assignee: Smart Packaging Solutions (SPS), Rousset (FR)

( * ) Notice: Subject to any disclaimer, the term of this patent is extended or adjusted under 35 U.S.C. 154(b) by 292 days.

(21) Appl. No.: 12/665,657

(22) PCT Filed: Jun. 19, 2008

(86) PCT No.: PCT/FR2008/000861
§ 371 (c)(1),
(2), (4) Date: Jun. 7, 2010

(87) PCT Pub. No.: WO2009/013407
PCT Pub. Date: Jan. 29, 2009

(65) Prior Publication Data
US 2010/0288842 A1    Nov. 18, 2010

(30) Foreign Application Priority Data
Jun. 21, 2007  (FR) ..................................... 07 04424

(51) Int. Cl.
*G06K 19/02* (2006.01)
(52) U.S. Cl. ......... 235/488; 235/380; 235/487; 235/489
(58) Field of Classification Search .................. 235/375, 235/385, 382, 382.5, 380, 379, 487, 488, 235/489
See application file for complete search history.

(56) References Cited

U.S. PATENT DOCUMENTS

| 5,399,847 | A | 3/1995 | Droz |
| 8,079,529 | B2 * | 12/2011 | Faith et al. ..................... 235/492 |
| 2001/0006194 | A1 | 7/2001 | Kayanakis et al. |
| 2003/0052177 | A1 | 3/2003 | Halope |

FOREIGN PATENT DOCUMENTS

| EP | 0 570 784 B1 | 11/1993 |
| JP | 2002-216097 A | 8/2002 |
| WO | WO 01/41060 A1 | 6/2001 |

OTHER PUBLICATIONS

International Search Report (PCT/ISA/210) dated Jan. 27, 2009 for PCT/FR2008/000861.

* cited by examiner

*Primary Examiner* — Karl D Frech
(74) *Attorney, Agent, or Firm* — Buchanan Ingersoll & Rooney PC

(57) ABSTRACT

The invention relates to an insert for a multilayer chip card, including an intermediate sheet and, on either side of the intermediate sheet, at least one outer sheet having a face in close contact with the corresponding face of the intermediate sheet, the intermediate sheet including at least one recess prior to the lamination of the insert. The insert having at least one of the outer sheets is made from a fluent material, such that, when the intermediate sheet is being laminated with the outer sheets, part of the material of the outer sheets moves into the recess in the intermediate sheet, thereby forming a visual and/or tactile defect on the surface of the insert, indicating whether of not the insert and/or the chip card is authentic.

16 Claims, 3 Drawing Sheets though it is only slightly. Consequently, on the outer surface of the outer layers, defects are observable in relief or in hollows, which indicate to a user the authentic character of the insert.

SECURE INSERT INTENDED, NOTABLY, FOR A CHIP CARD

The present invention relates to a secure insert, notably, for a chip card, and in particular, but not only, for a contactless chip card.

A plurality of methods are known in prior art for assembling the components of a chip card in view of obtaining a card having distinct characteristics of resistance to the bending, and to the delamination of the layers of the card body. Said known methods using a plurality of plastic sheets assembled by hot or cold lamination, have been fairly widely implemented, such that the chip cards have become of almost generalised use.

Unfortunately, the success of the chip card as a very widely used object has also developed a growing problem around the falsification of chip cards. Indeed, given the use of the cards notably in terms of payment, access control, identity control or even other applications of the chip card, it seemed tempting to some networks to place on the market counterfeit chip cards, not regularly issued by normal chip card issuers that are banks, telephone companies, or even other chip card issuers notably in the field of access control or identity control.

Some falsification techniques consist, for example, of erasing the logo which was produced by printing on the surface of the chip card, or even reproducing on fake chip cards, a counterfeit logo. Other falsification techniques consist of using the relative ease for separating the laminated layers of the chip card, in order to install a counterfeit insert, whilst keeping the original outer layers, or vice-versa.

Therefore, it seemed useful for the applicant to develop a chip card manufacturing method that makes it easier to check if a card is a true card issued by the legitimate issuer thereof, or if it concerns a falsified card.

Another aim of the invention is to propose a manufacturing method that makes it possible to increase the mechanical resistance to the dismantling of chip cards by delamination, which is most particularly useful for contactless chip cards provided with an insert carrying an antenna for the remote communication with a contactless chip card reader, but also for the conventional laminated contact cards.

For this purpose, the principle of the method according to the invention consist of providing the insert of the card with a homogeneous defect that is likely to produce after lamination a visual or tactile characteristic that makes it possible to recognise whether it is or is not a falsified card. Advantageously, said homogeneous defect, in addition to the visual or tactile effect, also produces increased resistance of the insert and of the chip card in relation to the dismantling of the layers of the card. Indeed, said visual or tactile characteristic is generated inside the card itself, such as to make later access to said characteristic, for falsification purposes, much more difficult.

Consequently, the aim of the invention is an insert for a multilayer chip card, comprising an intermediate sheet and, on either side of the intermediate sheet, at least one outer sheet having a face in close contact with the corresponding face of the intermediate sheet, the intermediate sheet comprising at least one recess, the insert being characterised in that the outer sheet is made from a fluent material, such that, when the intermediate sheet is being laminated with the outer sheets, a portion of the material of the outer sheets moves into the recess of the intermediate sheet, thereby creating a visual and/or tactile defect on the outer surface of the insert, constituting a form of signature indicating whether or not the insert and/or the chip card is authentic.

Advantageously, the shape of the recess represents a logo characteristic of the issuer and/or manufacturer of the insert.

According to another advantageous embodiment of the insert, it comprises not only one but a plurality of recesses, arranged such as to represent a logo indicating the origin of the insert or issuer of the chip card using the insert.

In order to manufacture with the aid of the invention high security inserts for contactless chip cards, it is planned that the intermediate sheet may be provided with an antenna. In this case, the recesses of the intermediate sheet of the insert are produced outside of the area covered by the antenna.

The invention also concerns a contact or contactless chip card using an insert such as above defined, and a method for manufacturing the insert and the chip card using the insert according to the invention.

Other features and advantages of the invention will appear from reading the detailed description and the appended drawings wherein.

Figure 1:
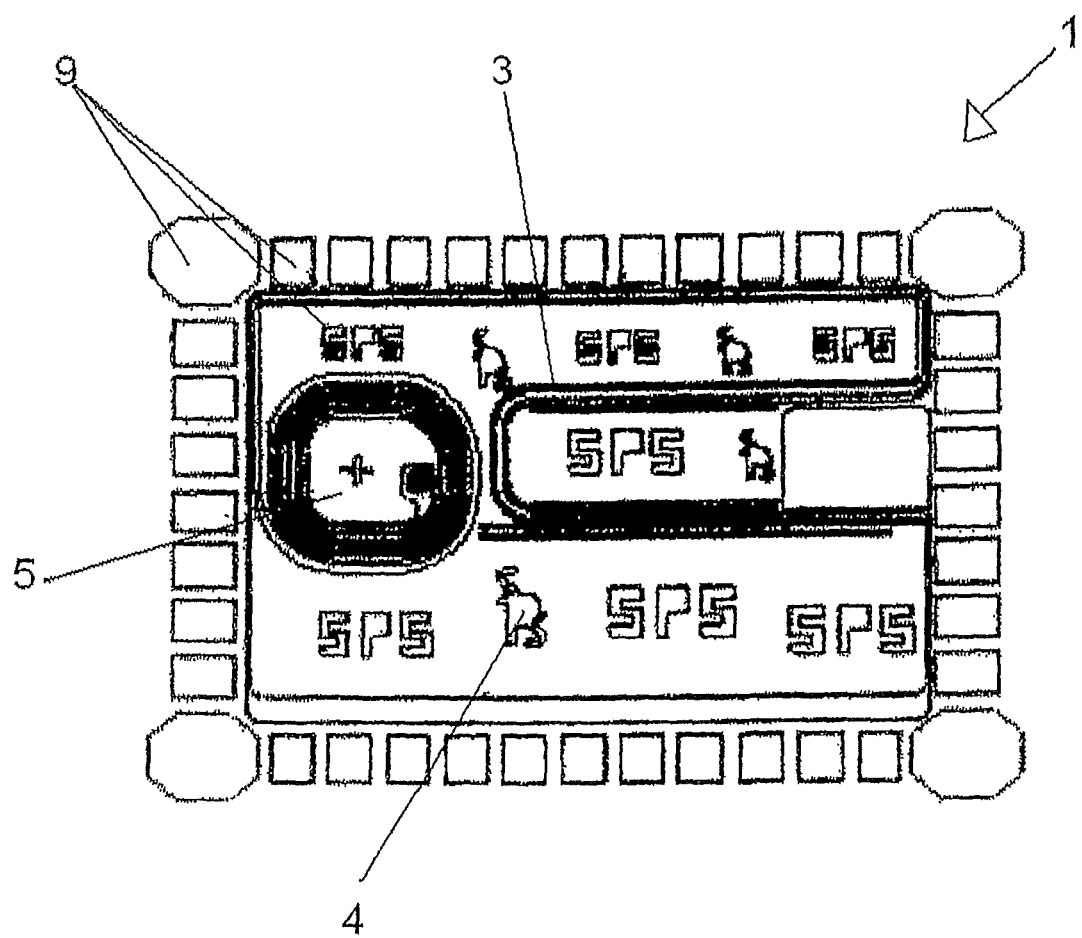
FIG. 1 illustrates an insert for a chip card, in plan view.

Reference is made to FIG. 1. In said figure, an insert 1 for a chip card according to the invention has been shown. The insert 1 shows in transparency an antenna 3 located in the thickness of the insert, or silkscreen printed on the surface thereof. It therefore concerns in this example an insert for a contactless card, but the invention is also applicable for inserts for contact cards.

As can be seen in FIG. 1, the insert 1 comprises a plurality of holes or recesses 9 which may be produced by cutting or moulding, according to the size and thickness characteristics of the insert. The juxtaposed holes may constitute any pattern or a predefined pattern by the issuer of the chip card using the insert. Thus, an insert can be very easily imagined the holes of which would represent the logo of a bank, or a bank card management or credit organisation. Thus in the example shown, recesses have been produced having the shape of the letters SPS. But it is also possible to plan a single recess, singly representing the contours of a logo 4, with no need for obtaining the shape of the logo by juxtaposition of several points or holes. It is in this way that the stylised "SPS" logo is produced in the example shown.

Figure 2A:
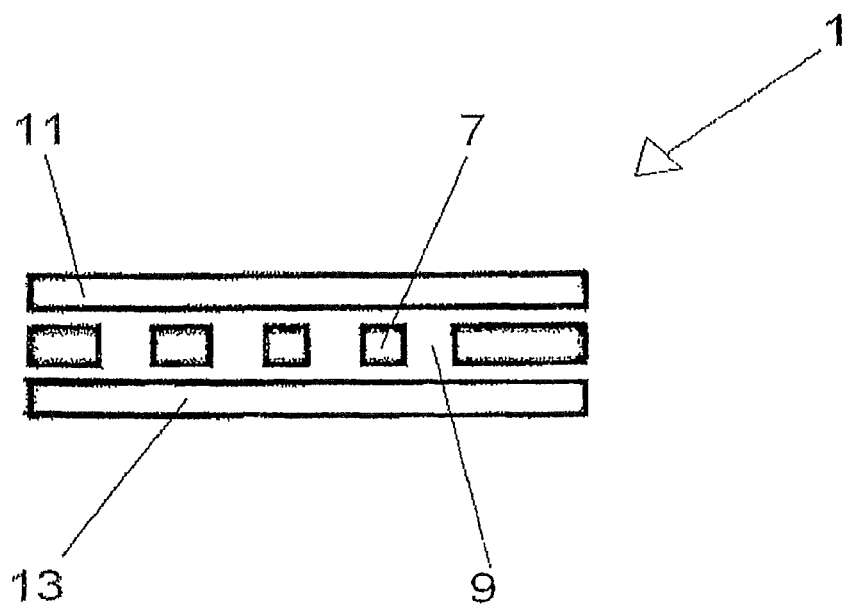
FIG. 2A illustrates the insert from FIG. 1, in cross-sectional view.
Figure 2B:
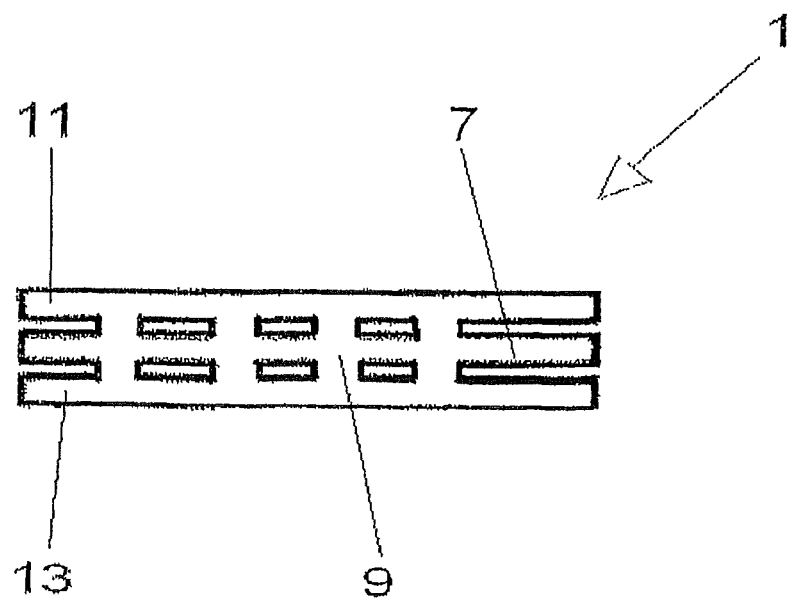
FIG. 2B shows the insert from FIG. 2A, after lamination.

Reference is made to FIG. 2A which shows in A-A cross-sectional view the insert 1 of FIG. 1. As seen, the insert is made from an intermediate layer 7 provided with a set of recesses or holes 9, and outer layers 11, 13. The intermediate sheet 7 has for example a thickness of approximately 40 micrometers, and the outer sheets 11, 13 have a thickness of approximately 100 micrometers, which makes it possible to produce a very thin insert of approximately 240 micrometers, very well suited to the embodiment of a standard thickness chip card according to the standard ISO 7816. Of course, other dimensions are possible without deviating from the scope of the invention, and it is also possible to use only a single outer layer made of fluent material, in which case the thickness thereof will preferably be between approximately 100 and approximately 400 micrometers.

It is important to note that the material of the outer layers 11, 13 of the insert 1 is fluent, i.e. that it is chosen in order to have creep characteristics which are such that during the step for laminating the layers of the insert, a portion of the material of the outer layers 11, 13 located opposite the recesses 9 of the intermediated sheet 7, can move towards the recesses 9, which creates a homogeneous defect of the material in said areas of the outer layers located opposite the holes 9. In any case, said lack of material results in a material density that is lower locally and consequently the pressing force applied to said areas of lower density generates a difference of perception that can be detected visually, or even tactily. A visual and/or tactile element is therefore thus generated on the insert, notably on the surface of the outer layers of the insert, due to the lack of material or the lower density at the level of the holes 9 filled during the lamination phase. According to the material chosen for the insert, the visual effect produced, for example the presence of a logo inside the insert, can be observed, by transparency or by reflection.

Furthermore, the filling of the recesses 9 of the insert by material creep of the outer layers towards the intermediate layer, produces a mechanical tenon/mortise type adhesive effect of the outer layers on the intermediate layer, such that any later attempt to separate the layers of the insert will leave easily detectable traces of tearing, which contributes to the security of the insert and of the chip card which uses such an insert.

Figure 3:
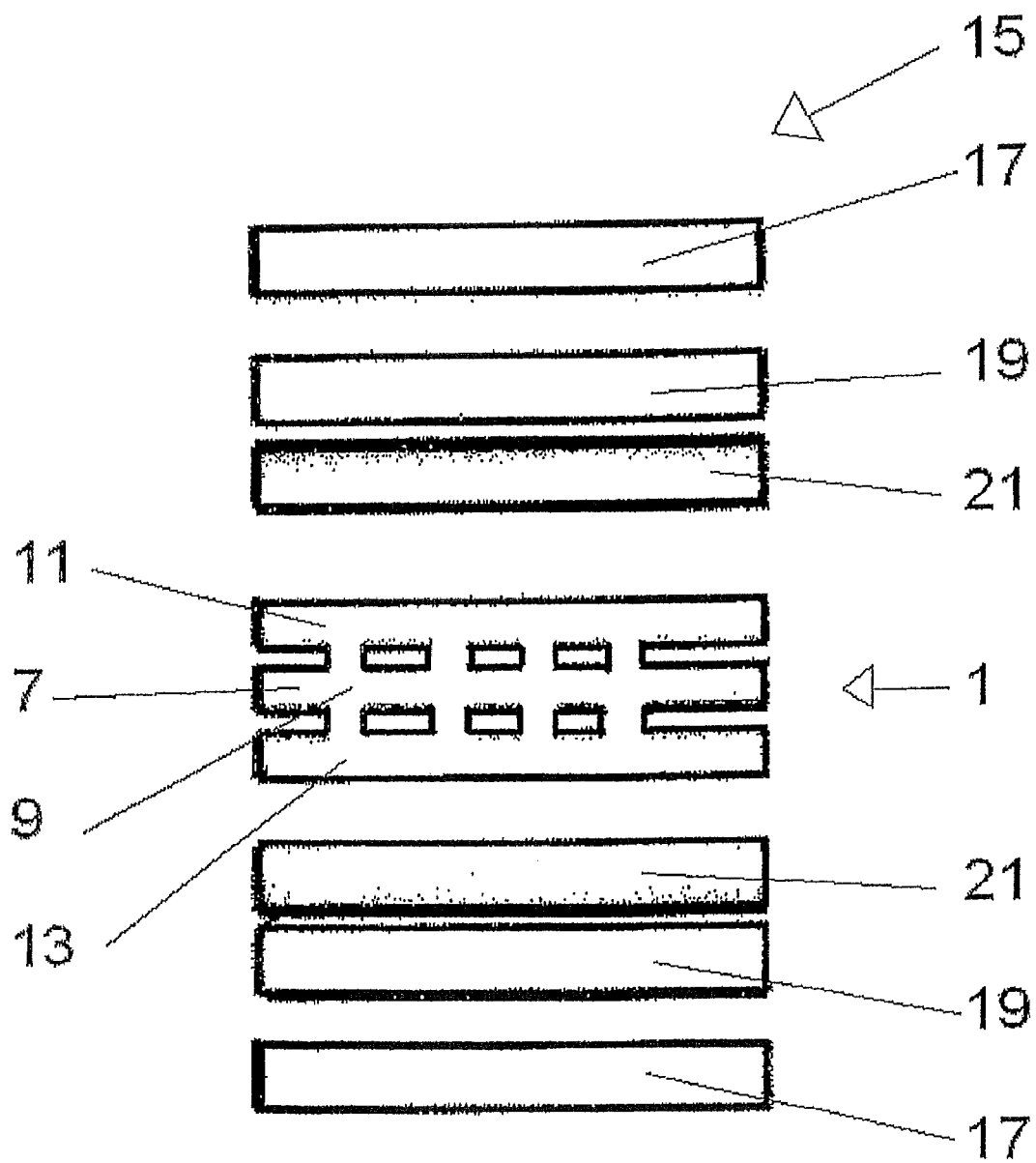
FIG. 3 illustrates in A-A cross-sectional view, a chip card comprising an insert according to FIGS. 1 and 2, and a plurality of outer layers located on either side of the insert.

In FIG. 3, the manner in which the insert 1 according to the invention may be used for producing a chip card 15 is shown. All you have to do is laminate the additional outer layers 17, 19, 21 of the chip card, according to a well-known lamination method. The surface defects created by the recesses of the intermediate sheet of the insert remain visible on the surface of the chip card 15 terminated, either directly, or according to a certain inclination of the card according to the observation light. Said difference of perception is sometimes called "flash" in English terminology. If the recesses are deep enough, it is also possible that the surface defects may be felt by touching the outside of the card.

The insert for the chip card according to the invention is particularly advantageous, in as much as it creates inside the insert 1, and consequently inside the chip card 15 using the insert, a visual and/or tactile element which enables the origin of the insert to be identified. Furthermore, the method for manufacturing the insert 1 by lamination means that the recesses 9 of the insert are filled with the material of the outer layers of the insert, and an assembly is obtained that can almost not be disassembled without leaving traces proving that the insert or the chip card has been dismantled. Therefore, the structure obtained with the aid of the invention is practically non-dismantable. If in spite of everything delamination should occur, it is even possible to plan the appearance at the level of the recesses filled during lamination, of a logo, or a desired text or message, for example the expression "VOID" in English terminology to signify that the card is unusable.

When the insert 1 according to the invention is used for manufacturing a chip card, the visible logo obtained at the level of the recesses 9 will be embedded inside the chip card. It can therefore not be erased, modified, or repeated on another card. But it will be sufficiently visible due to transparency, or according to the inclination of the card in relation to the observation axis.

Of course, the person skilled in the art will be better able to choose the pairs of materials used for the layers of the insert, as well as the temperatures and pressures applied during the lamination, to enable fusion of the materials to be laminated and thus obtain perfect adherence between the materials. The tests conducted by the applicant have shown that said technology works particularly well with Polycarbonate (PC) materials for the layers of the insert and/or of the chip card, but also with PVC or PET.

The invention claimed is:

1. An insert for a multilayer chip card, comprising an intermediate sheet and, on either side of the intermediate sheet, at least one outer sheet having a face in close contact with a corresponding face of the intermediate sheet, the intermediate sheet comprising at least one recess prior to lamination of the insert, wherein at least one of the outer sheets is made from a fluent material, such that, when the intermediate sheet is being laminated with the outer sheets, a portion of the material of the outer sheets moves into the recess of the intermediate sheet, thereby creating a visual and/or tactile defect on the surface of the insert indicating whether or not the insert and/or the chip card is authentic.

2. An insert according to claim 1, wherein the shape of the recess represents a logo characteristic of the issuer and/or manufacturer of the insert.

3. An insert according to claim 2, wherein the intermediate sheet comprises a plurality of recesses, arranged to form a logo indicating the origin of the insert.

4. A method for manufacturing an insert for a chip card according to claim 2, comprising the steps of:
providing a layer of material for the intermediate sheet of the insert, and arranging in said intermediate sheet at least one recess according to a predefined pattern;
on either side of the intermediate sheet of the insert, applying by lamination at least one layer of fluent material, such that during the lamination a portion of the material of the layers of fluent material moves into the recesses of the intermediate sheet of the insert thereby leaving defects on the insert that can be detected by sight and/or touch.

5. An insert according to claim 1, wherein the intermediate sheet comprises a plurality of recesses, arranged to form a logo indicating the origin of the insert.

6. An insert according to claim 5, wherein the intermediate sheet is provided with an antenna, and the recesses are produced outside of the area covered by the antenna.

7. A method for manufacturing an insert for a chip card according to claim 6, comprising the steps of:
providing a layer of material for the intermediate sheet of the insert, and arranging in said intermediate sheet at least one recess according to a predefined pattern;
on either side of the intermediate sheet of the insert, applying by lamination at least one layer of fluent material, such that during the lamination a portion of the material of the layers of fluent material moves into the recesses of the intermediate sheet of the insert thereby leaving defects on the insert that can be detected by sight and/or touch.

8. A method for manufacturing an insert for a chip card according to claim 5, comprising the steps of:
providing a layer of material for the intermediate sheet of the insert, and arranging in said intermediate sheet at least one recess according to a predefined pattern;
on either side of the intermediate sheet of the insert, applying by lamination at least one layer of fluent material, such that during the lamination a portion of the material of the layers of fluent material moves into the recesses of the intermediate sheet of the insert thereby leaving defects on the insert that can be detected by sight and/or touch.

9. An insert according to claim 1, wherein the intermediate sheet and the outer sheets are produced from a material chosen from polycarbonate, PVC and PET.

10. A method for manufacturing an insert for a chip card according to claim 9, comprising the steps of:
- providing a layer of material for the intermediate sheet of the insert, and arranging in said intermediate sheet at least one recess according to a predefined pattern;
- on either side of the intermediate sheet of the insert, applying by lamination at least one layer of fluent material, such that during the lamination a portion of the material of the layers of fluent material moves into the recesses of the intermediate sheet of the insert thereby leaving defects on the insert that can be detected by sight and/or touch.

11. A chip card with a multilayer laminated structure, comprising an insert according to claim 1, and on either side of said insert, at least one outer layer secured with the corresponding face of the insert by lamination.

12. A chip card according to claim 11, wherein at least one of the outer layers is produced from a material chosen from polycarbonate, PVC and PET.

13. A chip card according to claim 11, wherein the outer layers have a thickness of approximately 100 to 400 micrometers.

14. A method for manufacturing an insert for a chip card according to claim 1, comprising the steps of:
- providing a layer of material for the intermediate sheet of the insert, and arranging in said intermediate sheet at least one recess according to a predefined pattern;
- on either side of the intermediate sheet of the insert, applying by lamination at least one layer of fluent material, such that during the lamination a portion of the material of the layers of fluent material moves into the recesses of the intermediate sheet of the insert thereby leaving defects on the insert that can be detected by sight and/or touch.

15. A method for manufacturing a multilayer chip card, comprising the steps of:
- providing an insert according to claim 14;
- affixing on either side of the insert, at least one outer sheet of material,
- carrying out a final lamination operation in order to secure the insert and the outer sheets of material.

16. The method of claim 15, wherein the outer sheet of material is made of polycarbonate, PVC or PET.

* * * * *